United States Patent
Adams, Jr.

(10) Patent No.: US 7,230,621 B2
(45) Date of Patent: Jun. 12, 2007

(54) THREE-DIMENSIONAL IMAGING SYSTEM AND METHODS

(76) Inventor: William O Adams, Jr., 1019 E. Elgin Ave., Salt Lake City, UT (US) 84106

( * ) Notice: Subject to any disclaimer, the term of this patent is extended or adjusted under 35 U.S.C. 154(b) by 246 days.

(21) Appl. No.: 10/369,181

(22) Filed: Feb. 19, 2003

(65) Prior Publication Data

US 2003/0179193 A1    Sep. 25, 2003

Related U.S. Application Data

(60) Provisional application No. 60/358,494, filed on Feb. 19, 2002.

(51) Int. Cl.
    *G06T 15/00*    (2006.01)
(52) U.S. Cl. ................... 345/427; 345/629; 382/100
(58) Field of Classification Search ................ 345/427, 345/619, 629; 382/100

See application file for complete search history.

(56) References Cited

U.S. PATENT DOCUMENTS

| | | | | |
|---|---|---|---|---|
| 6,069,637 A | * | 5/2000 | Gaglione et al. | 345/629 |
| 6,331,861 B1 | * | 12/2001 | Gever et al. | 345/629 |
| 6,469,710 B1 | * | 10/2002 | Shum et al. | 345/619 |
| 6,912,293 B1 | * | 6/2005 | Korobkin | 382/100 |

* cited by examiner

*Primary Examiner*—Phu K. Nguyen
(74) *Attorney, Agent, or Firm*—TraskBritt

(57) ABSTRACT

The present invention relates to a system and methods for rendering simulated three-dimensional images on a display device. More particularly, the present invention involves systems and methods for organizing, configuring and transmitting data from a server to a client for the display of a simulated three-dimensional image.

14 Claims, 4 Drawing Sheets

THREE-DIMENSIONAL IMAGING SYSTEM AND METHODS

CROSS-REFERENCE TO RELATED APPLICATIONS

This application claims the benefit of U.S. provisional patent application, Ser. No. 60/358,494, filed Feb. 19, 2002.

FIELD OF THE INVENTION

The present invention relates to a system and methods for creating object representation data and interactive display program used to configure, interpret, display and interact with the same. More particularly, the present invention involves systems and methods for capturing, preparing, organizing and transmitting data, to and from an interactive display device, for the configuration, interpretation, display and interaction of a viewable object, such as a vehicle. The object representation data may simulate three-dimensional objects or animations.

BACKGROUND OF THE INVENTION

Background: The use of computers and computing devices is constantly increasing within our society. Personal computer use, as well as business computing use, is on the rise. Furthermore, many smaller devices, such as cell phones, personal digital assistants, and pagers, are being developed to display additional information to a user. As advances in computing devices occur, advances in display devices for displaying information on the computing devices are also occurring.

Advances in display technology for graphics and object images are also occurring. Robust display systems and programs for displaying pixel-based images are replacing simple text and character based graphical imaging systems. Many of the display systems and programs allow for the display of higher definition images and incorporate functions for manipulating such displays. The use of objects and displayed images to display information is becoming more popular in the marketplace. Advancements in imaging and object displays are very apparent on the Internet. As the Internet has evolved, graphical displays and graphical interaction over the Internet has become more popular. Many web pages contain multiple images and/or pictures for display on a display screen of a computing device.

As more pictures and/or three-dimensional objects are incorporated with Internet pages, more time and energy is required to create these complex resources and more memory and computer CPU power is required to load them. Furthermore, the amount of bandwidth required to transmit such object representation data between computing devices is also increased, thereby making transmission of and interaction with rich multimedia and object representation data practical. Most existing methods and technologies display three-dimensional objects using interactive three-dimensional display programs called geometry rendering engines which transform three-dimensional data and detail imagery into pixels in a process called rendering. Each polygon or piece of the geometry may have many detail images. These methods don't require large bandwidth, but are very computationally intensive requiring fast CPU's, extra memory and a period of time between each interaction to transform the geometry and its images to render and display it. In addition, the meshwork of geometry required by geometry rendering engines requires significant work to capture, optimize and combined with detail images to represent a three-dimensional object. This is especially true of complex shapes which are cost-prohibitive to create. A vehicle would be a good example of an intricate and complex three-dimensional shape.

Another type of interactive three-dimensional display program uses a matrix of captured images to simulate the object by displaying pictures of it at different angles as the user interacts with it using an input device. This technology is very cost effective for production but requires more bandwidth and a fraction of the computation to display. There aren't any products on the market that have utilized this methodology to configure an object or provide auxiliary information about individual views of the object.

Object representation data sets require specific interactive three-dimensional display programs specific to the format of their data for interpretation, manipulation and display. These programs must typically be stored on the computing device and linked to the type of object representation data they can interpret. For instance, a web-browser surfing the Internet may attempt to display object representation data loaded from a web page. If the interactive display program that can interpret, display and interact with the object representation data hasn't been installed and associated with the web-browser or is not recognized by the web-browser, the web-browser may not be able to interpret, display or interact with it. In many cases, the web-browser may be altered to represent the object data by loading the interactive display program as a web-browser plug-in, or supplemental program, specifically designed to represent it in the web-browser. The use of plug-ins with web-browsers is well known.

Although plug-ins are typically available for displaying images, their use can be complicated and frustrating. Typically, a user first finds out that they are unable to view an object or animation at the time they try to download it. If it does not load and display, a user may or may not be provided with a link for obtaining a plug-in for viewing the desired object representation data, as seen with certain popular operating systems and media types, such as QuickTime VR™, which is installed with the incorrect display type by default in Microsoft Windows™. If a plug-in exists, a user is typically required to download the plug-in, install the plug-in, reboot their computing device, and reload the object representation data needing the plug-in. These steps take time and may be frustrating to the average computer user. Thus, many users just ignore the plug-ins and avoid viewing objects that their web-browser does not display by default.

Furthermore, current client applications operating on electronic devices such as personal digital assistants or cell phones are limited by the amount of available memory and computing power required by the interactive display programs and the object representation data they interpret and display.

Therefore, it is desirable to provide a system and methods for capturing, interpreting, displaying and interacting with objects, animations, and where applicable, information about the object, without the requirement of a plug-in to view the images. Furthermore, it is desirable to provide a system and method that easily and cost-effectively creates object representation data for a wide array of display devices that differ in computational power, memory and input methods.

SUMMARY OF THE INVENTION

The present invention relates to a system and methods for creating object representation data and the interactive display program used to configure, interpret, display and interact with the same. More particularly, the present invention involves systems and methods for capturing, preparing, organizing and transmitting data to and from an interactive display device for the configuration, interpretation, display and interaction of a viewable object, such as a vehicle. The object representation data may simulate three-dimensional objects or animations.

In one embodiment of the present invention, various systems and methods for capturing, configuring, transmitting, interpreting, manipulating, displaying and interacting with object representation data are provided. The systems and methods allow a client to request a graphical user interface from a server wherein the graphical user interface may include configuration data and logic as well as object representation data. Using the graphical user interface, a user may request a new configuration of the object representation data by selecting certain configuration data. The configuration data selected by a user with the graphical user interface may be obfuscated and transmitted to a server for processing and creating new object representation data. The object representation data and other relevant information or configuration options may be obfuscated and passed back to the client. The client may un-obfuscate, prepare for display, and display the object representation data and relevant information.

More particularly, the present invention involves a system and method for rendering images on a display device of a remote or client machine regardless of the presence of a plug-in. In one embodiment of the present invention, object representation data may be created from a number of images of an object. Each object image may include a different angle or view of the object. The images may be combined into a single image comprising a two-dimensional matrix of images wherein one dimension represents all of the images having similar radial heading angle views and the other dimension represents images having similar radial pitch angle views. A mask image may also be created for the images of the two-dimensional matrix. The mask image may be used to provide effects for each pixel of the object images contained in the two-dimensional matrix image wherein grayscale or coloring may be used to define the effects of the mask.

An image data file representing the image and its effects may be created from the two-dimensional matrix image and the mask image. The image data source file comprises a single, uncompressed file of all of the desired views of an object. The image data file may be created by analyzing the red, green and blue values for each pixel of each individual object image in the two-dimensional matrix image and altering the pixel color data using the mask image data pixel values as input parameters. The result values for each pixel may be stored in various bit depths and compression schemes. The combination of data for each pixel comprises the resultant object representation data.

The image data file may be passed to a computing device to be stored in a memory buffer for retrieval. A program, or set of methods and functions, for interpreting the image data file may also be passed to the computing device. The program or data may be used to properly request and interpret or optimize the image data file and display an image represented by the image data file on a display device associated with the computing device. Based upon user interactions, the program may alter the displayed image using data from the image data file and image data file parameters defining the movement of an image.

The program may also display information about portions of a displayed image on the display. The displayed data may be used to display additional effects, such as animation of said portion of the displayed image, options, and information that may be incorporated with the displayed image. For instance, background features, colors, sizes, and other characteristics of an object may be displayed as optional selections. If a selection is made and requested, the image data may be altered to include the selected options and redisplayed on the display device or transmitted to the server to further configure the simulated three-dimensional image.

DESCRIPTION OF THE DRAWINGS

While the specification concludes with claims particularly pointing out and distinctly claiming that which is regarded as the present invention, the present invention may be more readily ascertained from the following description of the invention when read in conjunction with the accompanying drawings in which:

DETAILED DESCRIPTION OF THE INVENTION

The present invention relates to a system and methods for rendering images on a display device to simulate three-dimensional objects, animations and/or information about such objects and/or animations. More particularly, the present invention involves systems and methods for organizing and transmitting data from a server to a client for the display of a three-dimensional image.

As used herein, interactive display program means any program that can interact with a stimulated three-dimensional object or with an animation. Object representation data means any animation or three-dimensional object that does not include three-dimensional geometry. Interactive display device means any device that can display pixel information (e.g., a cell phone or a heads-up display (HUD)) and which has input capability (e.g., such as motion capture, mouse, stylus or thumbpad).

Figure 1:
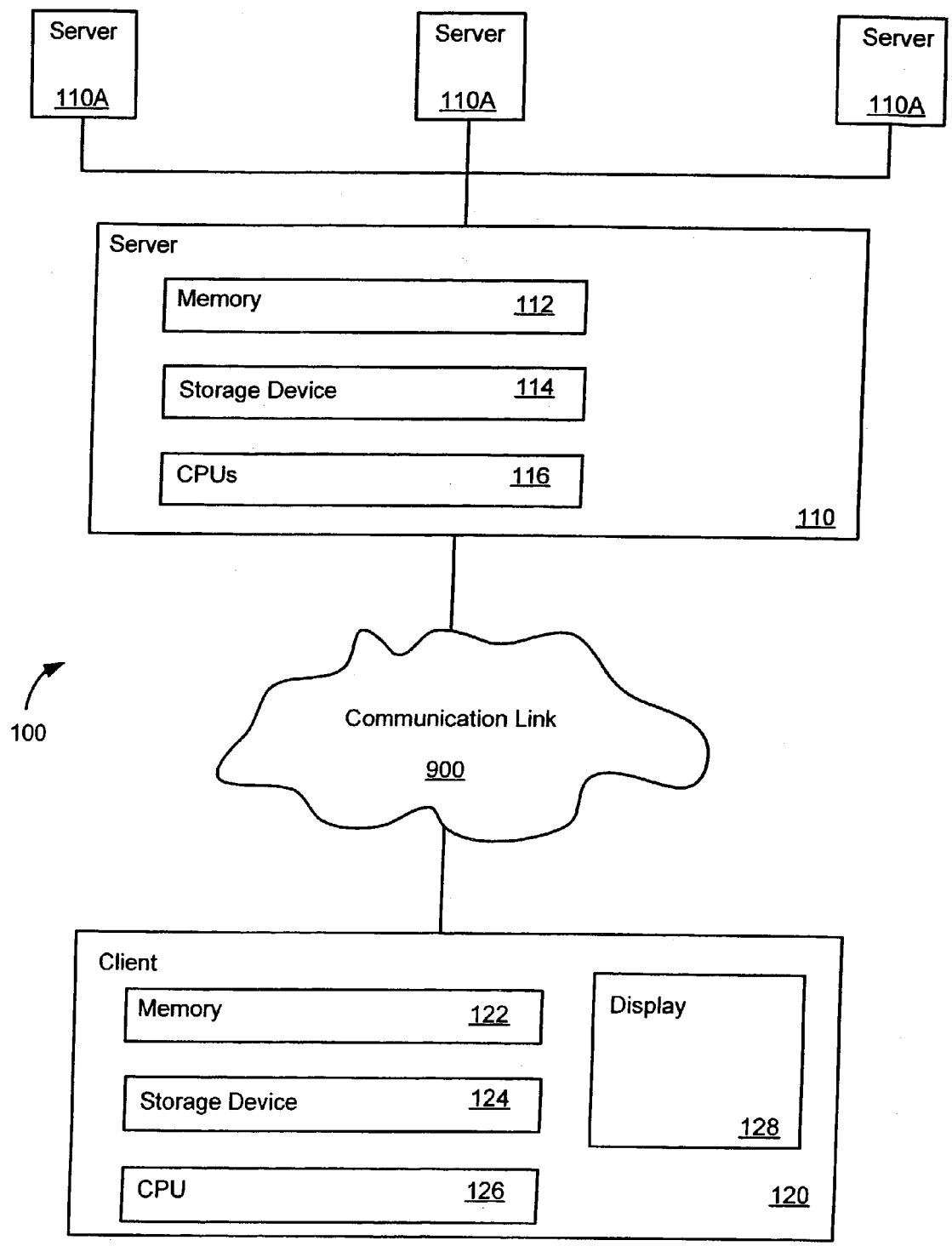
FIG. 1 illustrates a block diagram of a system that may be used to carry out the various embodiments of the present invention.

A system 100 that may be used for carrying out the various embodiments and methods of the present invention is illustrated as a block diagram in FIG. 1. System 100 may include a server 110, a client 120 and a communication link 900 for communicating data between server 110 and client 120. System 100 may also include distributed servers 110A for communicating data with server 110.

Server 110 may include any electronic device for processing, receiving, transmitting, and storing data. Typically, server 110 may include a computer or any server 110 as known and used with computer network systems. Server 110 may also include one or more memories 112 for storing data, one or more storage devices 114 for storing data, and one or more central processing units 116 (CPU) for processing or manipulating data. Storage devices 114 may include physical devices or virtual components for storing data. For instance, storage devices may include computer hard-drives, optical storage devices, file systems, databases, storage area networks, and the like. Furthermore, server 110 may be a distributed server system.

Client 120 may include any electronic device for processing, receiving, transmitting, storing, and displaying pixel-based data. For instance, client 120 may include computer workstations, personal computers, laptop computers, cellular phones, personal data assistants, television set-top boxes, video gaming consoles, and the like. Typically, client 120 may include or more memories 122 for storing data, one or more CPUs 126 for processing and manipulating data, and one or more display devices 128 for displaying pixel-based images rendered from data. A client 120 may also include a storage device 124.

Communication link 900 may include any type of communication link over which data may be transmitted between server 110 and client 120. For instance, communication link 900 may include a wired communication link such as a cable link, a wireless communication link such as a microwave link, 802.11b or an optical communication link such as an infrared link. Server 110 may send data to, and receive data from, client 120 using communication link 900. Likewise, client 120 may send data to, and receive data from, server 110 using communication link 900. Typical communication links may include network communication links, intranet links, Internet links, and the like.

Figure 2:
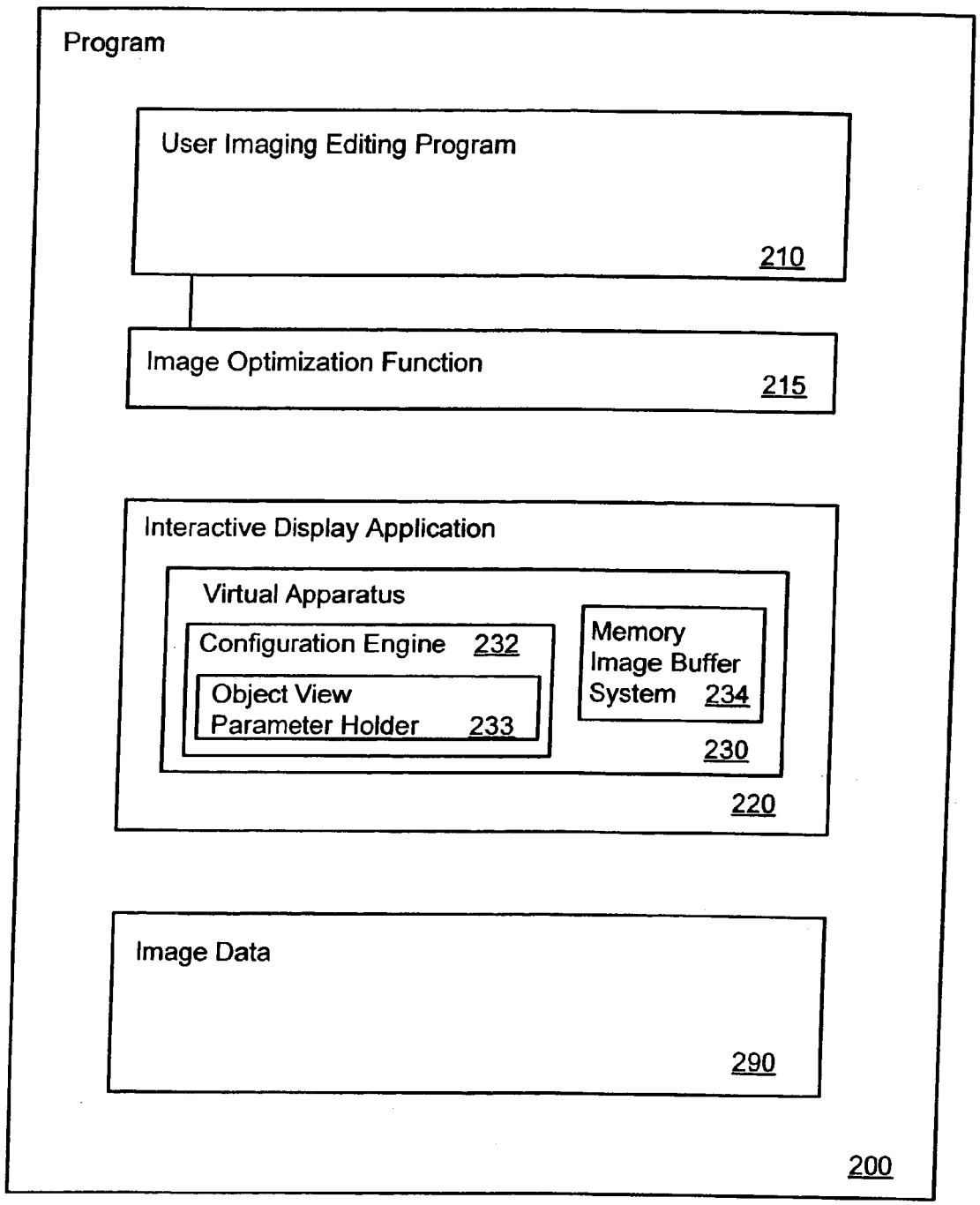
FIG. 2 illustrates a block diagram of a number of components of a computer program that may be used to carry out the various embodiments of the present invention.

The various embodiments of the present invention comprise a set of programming codes or methods for facilitating the display of object representation data on a display device 128 of a client 120 wherein the displayed images are created from data transmitted from a server 110 to the client 120. Furthermore, the present invention may transmit the necessary programming codes to the client 120 for displaying a three-dimensional image on a display device 128 without the aid of additional software or hardware resident on the client 120. A set of programming methods and functions that may be used to carry out the various embodiments of the present invention is illustrated in FIG. 2. Although each of the methods, functions, and subprograms is illustrated as a component of the program 200 making up the present invention, it is understood that the methods, functions, and subprograms may exist as stand-alone, or separate, programs capable of interacting with the other components of the present invention. Program 200 may include a plurality of methods, functions, and subprograms, including a user imaging editing program 210, an interactive display application 220 and object representation data 290 (also referred to herein as image data 290).

The user imaging editing program 210 may include commercially available photo or image editing programming for manipulating and saving digital or electronic images. For example, Adobe Photoshop® may be used as a stand-alone user imaging editing program 210. Alternatively, programming code for defining and executing a customized digital image manipulation program may be incorporated with the various embodiments of the present invention for accomplishing the tasks of the user imaging editing program 210.

The user imaging editing program 210 may be used to create image data 290 used by the present invention to display a three-dimensional image of an object. A pixel-based, non-tiled image may be created that includes a matrix of object images and masks for defining a three-dimensional image that may be stored as image data 290. To create the image data 290 for use with the present invention, a plurality of photographs of an object is taken and sorted into a two-dimensional matrix having x and y dimensions. The plurality of photographs may be created using digital photography, digital videos, or other photographic methods. Optionally, the user imaging editing program 210 may be used to manipulate scanned images of photographs into digital images for use with the present invention. Preferably, each image of an object represents a different view of the object wherein each image has a constant focal length and perspective of the object being imaged. The user imaging editing program 210 may also be used to perform image optimizations such as creating derivative matrix images or decreasing the magnitude to color in the image to promote stronger compression.

The plurality of object images, or source images, may be modified and combined into a single image consisting of a two-dimensional matrix of images using the user imaging editing program 210. Modifications to the plurality of object images may be performed prior to combining the images into a single two-dimensional matrix. Modifications may include cropping, sizing, alignment, image enhancement, or other alterations available to the user imaging editing program 210. Once modified, the plurality of object images may be combined into a single source image comprising a two-dimensional matrix of images, or image data 290. The image data 290 comprises one or more pixel-based images representing different views of an object. Preferably, an x-dimension of the matrix includes one or more views of an object from varying radial heading angles. A matrix y-dimension may also be included wherein the images in a column of the matrix y-dimension represent differing radial pitch angle views of the object image in the corresponding matrix x-dimension. Thus, the matrix consists of one or more rows of object images having identical pitch angles and one or more columns of object images having identical heading angles. The rows and columns of object images comprise a portion of the image data 290 that may be used to create a three-dimensional image on a display device 128 of a client 120.

Image data 290 may also include a separate, grayscale mask image for defining shadows, lighting effects, transparency and pixel operation magnitudes such as pixel displacement for the object images contained within the matrix. A grayscale mask image may include differing shades of gray wherein the varying shades of gray represent shadows and lighting effects for the source images. The grayscale mask may be stored as an 8 bit image, wherein the silhouettes of the object images appear as the opposite luminosity of the background of the mask image.

Additional option mask layers may be created for providing options that may be included with a three-dimensional image of an object. For instance, the option mask layers may include option images that overlie the source images to depict an additional image over the source image. For example, an image of a red circle may be provided in the source matrix. An option image of a smaller blue circle that may appear in the center of the source image may be included in an option matrix. A simulated three-dimensional rendering of the source object from the image data 290 would display a red circle. However, if the three-dimensional rendering of the object also called for the optional blue circle, the rendered image would display the option image with the object image, creating a blue circle within a red circle. Thus, the various masks and option matrix images may be used to enhance and further define a three-dimensional image of the present invention. The masks and option matrixes may be included in the image data 290.

In a further embodiment of the image data 290 of the present invention, a third dimension may be added to the matrix wherein the additional z-dimension of the matrix may contain object images that may be used to create animations in a three-dimensional image. For instance, a set of z-dimension images may be used to visually change the size of the source image of the red circle, causing a displayed image of the red circle to decrease to a smaller red circle as the z-dimension images are displayed. If the animation is requested from the image data 290, the z-dimension images may be used to create an animation of a shrinking circle.

The masks and image matrixes for an object may be combined into a single, uncompressed file that may be stored as image data 290 and may be used by the various components of program 200 to create three-dimensional images for display. An image optimization function 215 may be used to manipulate the masks and image matrixes into the single, uncompressed file. The file may be saved by the image optimization function 215 as image data 290 for use by the present invention to render object representation data on a display device 128.

An executed image optimization function 215 retrieves the source image and any mask image created by the user editing imaging program 210 and combines the images into a single, uncompressed image data 290. To create the image data 290, the pixel values of the source image and the mask image are read by the image optimization function 215 in a left-to-right and top-down manner and combined. The combination of a source image pixel and a corresponding mask image pixel is written as ordered bytes in the order Mask.Red.Green.Blue to represent a 32-bit image, also known commonly as ARGB. The order qualifications—Mask, Red, Green, Blue—represent the pixel values of the mask image, the red value of the source image pixel, the green value of the source image pixel, and the blue value of the source image pixel, respectively. The ordered bytes may then be saved as image data 290 by the image optimization function 215, such that each of the pixels of all of the matrix images, mask images, and option images are combined into a single file.

The image data 290 may be stored on server 110 or on a device such as a storage device or memory. Optionally, image data 290 may be stored on a distributed server 110A and accessible to server 110 or on a media that may be read by a server 110 or client 120. In one embodiment of the present invention, the image data 290 may be saved as a MIME data type.

The combination of the pixel values and the mask values into a single, uncompressed file allows shadow and lighting effects to be simulated using the mask value of the ordered bytes. This method of combining the source image and the mask images allows quicker imaging of image data 290 because the effects on a single pixel are combined with the pixel values, thus, separate layers and definitions are not necessary to create image effects. Furthermore, the combined image data 290 may be quickly communicated between computing devices thereby allowing and facilitating more rapid Internet interactions.

The interactive display application 220 of the present invention may comprise multiple components. The components of the interactive display application 220 may be used to receive imaging requests, send images from a server 110 to a client 120, send imaging coding for converting image data 290 into three-dimensional images to a client 120, and processing communications between a client 120 and a server 110 hosting program 200.

In one embodiment of the present invention, the interactive display application 220 may include a virtual apparatus 230 comprising software for emulating a graphical display of a control panel or selectable information. The programming of the virtual apparatus 230 may be used to create a visual display on a display device 128 of a client 120 for rendering three-dimensional images. Programming for creating a configuration engine 232 and a memory image buffer system 234 on a client 120 may be included with the programming of the virtual apparatus 230 for facilitating the display of a three-dimensional image. The virtual apparatus 230 programming may be passed to a client 120 along with image data 290 to accomplish the three-dimensional imaging of the present invention.

Figure 3:
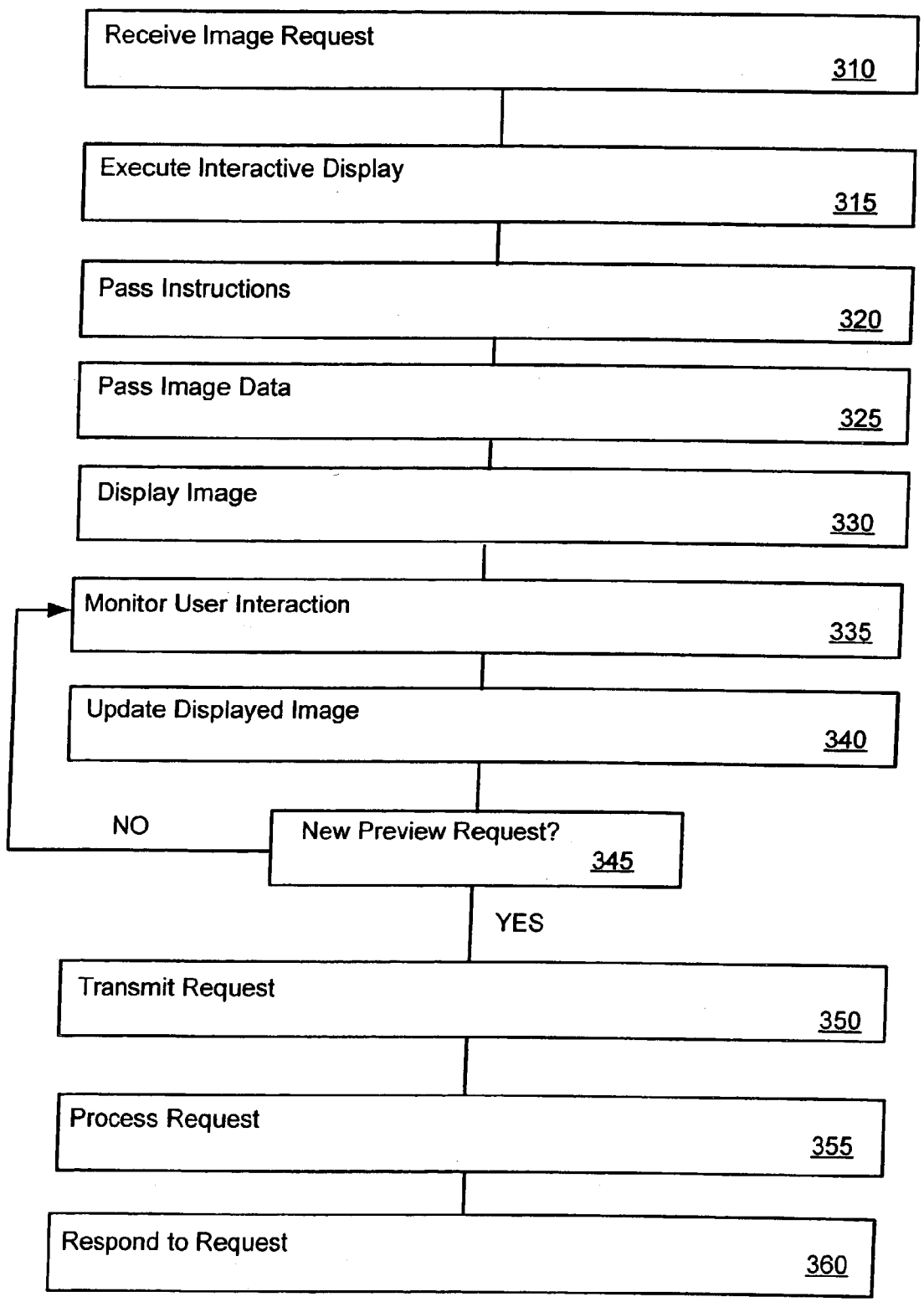
FIG. 3 illustrates a flow diagram of the logic that may be used to carry out the various embodiments of the present invention.

The various components of the present invention may be better understood with reference to FIG. 3 wherein a flow diagram of the methods and steps used by program 200 are illustrated. A server 110 monitoring communication links may receive an image request 310 for an interactive display according to the present invention from a client 120. Upon receiving an image request, server 110 executes 315 the interactive display application 220 and passes instructions 320 to client 120. Instructions passed to client 120 may be used with image data 290 to create a three-dimensional image on a display device 128 associated with client 120. The instructions passed to the client 120 may include instructions created by the interactive display application 220. Once executed, the interactive display application 220 also passes image data 290 (step 325) corresponding to a requested image to the client 120. Image data 290 may be displayed 330 on a display device 128 of client 120. The instructions passed 320 to the client 120 also monitor user interaction 335 for requests for alterations to the displayed image or for additional information associated with the displayed image. Upon detecting a user interaction with the displayed image, the displayed image may be updated 340. If the user interaction constitutes a request to preview a new image 345, the request is transmitted 350 to program 200 residing on server 110. If the user interaction does not constitute a new image preview request, user interactions continue to be monitored 335. Upon receiving a transmitted request, program 200 processes the request 355 and responds to the request 360. A response to a request 360 may include passing image data 325 to the client 120 for display on a display device 128.

Figure 4:
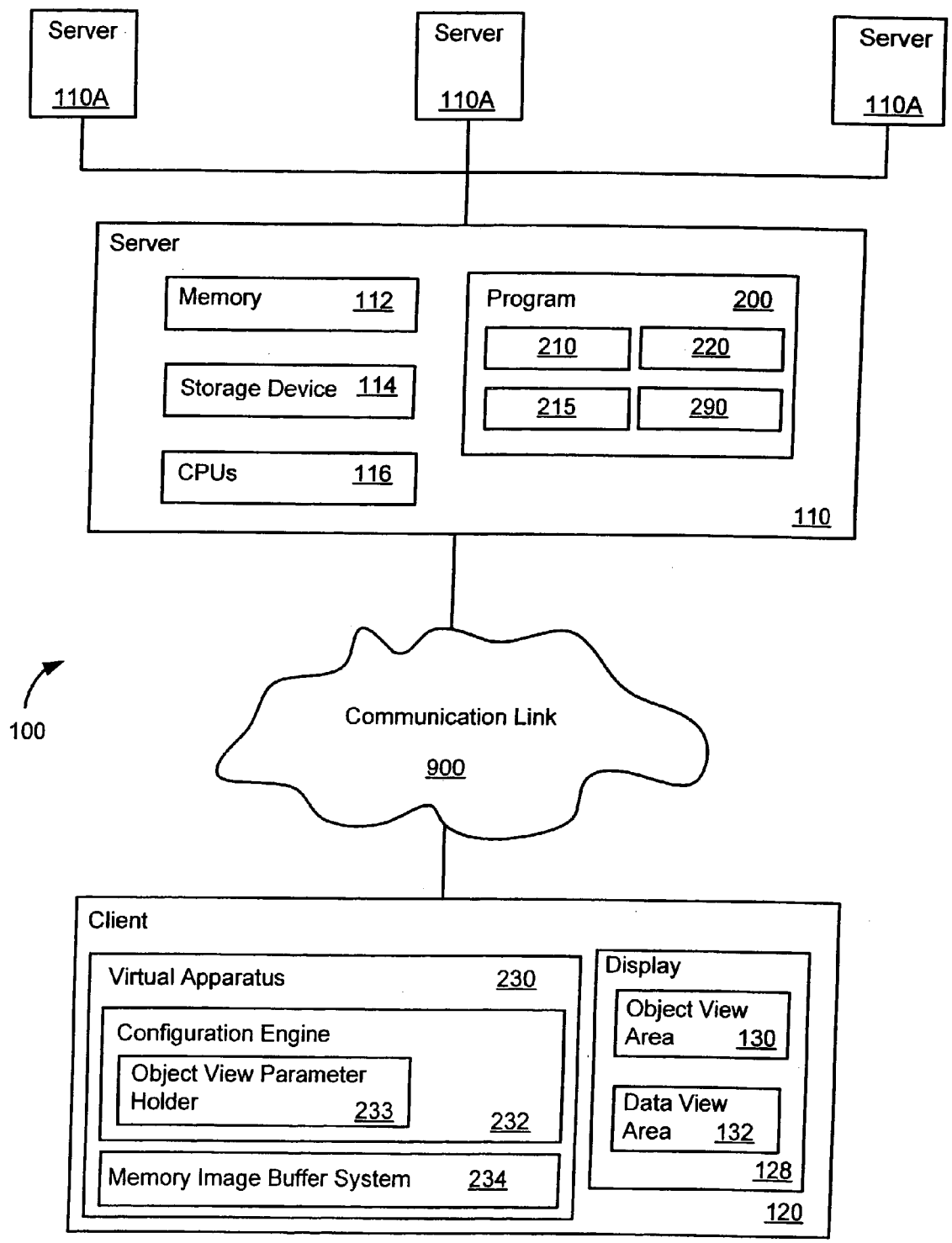
FIG. 4 illustrates a block diagram of a system that may be used to carry out the various embodiments of the present invention.

The methods and steps used by program 200 to carry out the methods and steps illustrated in FIG. 3 may be better understood with reference to FIG. 4 in combination with FIG. 3. A system 100 for carrying out the various embodiments of the present invention is illustrated as a block diagram in FIG. 4. For the purpose of clarity, the numbering of system 100 components in both FIGS. 1 and 4 remain consistent for like components.

In one embodiment of the present invention, an image request may be received 310 by a server 110 hosting program 200. Once an image request is received and recognized, the interactive display application 220 of program 200 is executed 315. The execution 315 of interactive display application 220 causes the program 200 to pass instructions 320 to the client 120. Typically, the instructions are passed in the form of programming code for creating and/or executing operations on a client 120. For instance, upon execution 315 of the interactive display application 220, the interactive display application 220 may pass programming codes associated with the virtual apparatus 230 to client 120. The programming codes of the virtual apparatus 230 may initiate the formation of a configuration engine 232 and a memory buffer image system 234 in a memory, or on a storage device, of client 120. In addition, the virtual apparatus 230 may define the display device 128 area of the client 120 for receiving data for display. As illustrated in FIG. 4, the display device 128 of client 120 may be configured by the instructions passed to the client 120 to include an object view area 130 and a data view area 132.

Image data 290 may be passed 325 to the memory image buffer system 234 created on the client 120 by the instructions passed from program 200. Configuration engine 232 may act on, or use, the image data 290 passed to the memory image buffer system 234 to display a three-dimensional image 330 in the object view area 130. Additional data, such as information associated with different portions of the displayed image, may be displayed in the data view area 132 of display device 128. For instance, image data 290 representing an image of an apple may be associated with data containing information about the kind and size of the apple that is displayed by the image data 290. The information about the apple may be displayed in the data view area 132 at the time the image of the apple is displayed in the object view area 130.

A user may interact with a displayed image using an input device associated with client 120. For instance, a mouse pointer may be moved over an image displayed in object view area 130. As a mouse pointer moves over a displayed image, the user interaction may be monitored 335 by the configuration engine 232. In response to a user interaction, configuration engine 232 may update the displayed image 340 based on image data 290 stored in memory image buffer system 234. For instance, a mouse button may be depressed while a mouse pointer is moved over a displayed image. Recognizing the interaction, the configuration engine 232 may respond by rotating the displayed image according to programming of the configuration engine 232 and the image data 290 stored in memory image buffer system 234. The rotation of the image in response to the mouse pointer selection of the image allows the image to be viewed as a three-dimensional image.

The configuration engine 232 may also monitor the user interaction 335 to detect a request for a new image preview. Upon receiving such a request, a new image request may be transmitted 350 to program 200 on server 110. While configuration engine 232 waits for a response from a transmitted request, a user may continue to interact with the image displayed in object view area 130 and configuration engine 232 may continue to alter the image according to any user interaction.

Program 200 may respond to a received request for a new image from a configuration engine 232 by sending new image data 290 (corresponding to the new request) to the requesting configuration engine 232 for storage in a memory image buffer system 234. The new image data 290 may then be used by configuration engine 232 to display an image in the object view area 130.

Image data 290 may be encoded and/or decoded for transmission between server 110 and client 120 using known methods, including the use of http tunneling. Optionally, object representation and image data 290 may be obfuscated to prevent reverse engineering of data and transmission between a server 110 and a client 120. The optional obfuscation may pull text through a stream metaphor and transpose characters based on an array of numbers where the array length is the number of characters per block that will be transposed, the array index is the character source position and the value at the array index is the destination index of the transposed character. The client 120 and server 110 may have the same array of indexes. A random number of space characters may be artificially inserted at random intervals where spaces already exist because white space is ignored upon receipt but affects the array obfuscation such that the exact same transmission will be different every time. Using this obfuscation method, speed is preserved.

Encoded, and optionally obfuscated, image data 290 may be wrapped by program 200 in a simple Hypertext Markup Language (HTML) format so that any attempt to view the data by an unauthorized individual will produce a web-page response. Prevention of misdirection of information may be preserved using a handshake system between the server 110 and the client 120.

In one example of the present invention, a user operating a client 120, such as a computer, a personal digital assistant, cell phone, or other device capable of displaying pixel based images, connects to a server 110 using communication link 900 such as by an Internet connection using a web-browser. The client 120 requests connection to program 200 and an image for display on a display device 128 of the client 120. If client 120 has previously connected with program 200 a configuration engine 232 and memory image buffer system 234 may be resident in a memory, or on a storage device, associated with the client 120 and communication of those portions of the interactive display application 220 to create such programs on client 120 may not be necessary. However, interactive display application 220 may be configured to transmit the programming of the virtual apparatus 230 to a client upon every request for a communication session between a client 120 and server 110. This differs from the programs currently available for display images on a client 120 because no plug-in, or resident programming, is required for the system and methods of the present invention to operate on a client 120 for displaying a simulated three-dimensional image. Thus, the present invention may be used across multiple platforms to display images without encountering compatibility problems.

Image data 290 corresponding to a desired three-dimensional image may be requested from program 200 once the virtual apparatus 230 has transmitted the configuration engine 232 and memory image buffer system 234 on client 120. Certain characteristics of the image associated with image data 290 are also communicated to the configuration engine 232 for providing image information for creating a three-dimensional rendering of the image from image data 290. For instance, matrix dimension magnitudes for x and y dimensions may be stored in an object view parameter holder 233 corresponding to the configuration engine 232. The magnitudes of an image stored in the object view parameter holder 233 may define the views of the image for three-dimensional display. Based upon the magnitude values stored in the object view parameter holder 233, the configuration engine 232 may monitor user interaction with a displayed image and alter the image accordingly. For example, an image may be displayed in an object image area 130. The displayed image has a position corresponding to the x and y dimensions of the image data 290 and is identified by that image data. As a user manipulates a mouse, or other graphical user interface tool, over the displayed image the configuration engine 232 determines the magnitude of the movement of the graphical user interface tool and translates the movement into an x and y dimension magnitude corresponding to the x and y dimensions of the image data 290. As the magnitude of the x and y dimensions of the graphical user interface tool change over the image, the magnitudes are compared to the magnitudes stored in the object view parameter holder 233. A new image retrieved from the image data 290 stored in memory image buffer system 234 corresponding to other x and y dimensions is displayed as the graphical user interface is moved. In this manner, fluid tracking of an object image is accomplished without loading additional images into memory because all of the images comprising the displayed three-dimensional image are stored as image data 290 in memory image buffer system 234. The present invention therefore provides for fluid display of a three-dimensional image using image data 290 consisting of a set of images corresponding to multiple dimensions.

When a client 120 initially loads image data 290, program 200 resources, or other data into a memory the resources and data may be grouped and prioritized to load synchronously. Using synchronous loading, a display device of client 120 may begin to display images and data for a user so that the user may begin to interact with the program 200. Using an incremental loading structure, the program 200 helps to support more rapid communications over slow communication links and prevent multiple threads from being opened in a communication. Furthermore, unnecessary options may be loaded last in order to allow a user to interact with the image data 290 quickly.

The present invention also allows a user to request a new preview 345 of an image. For instance, an image of a vehicle may be displayed as image data 290 on a display device 128 of client 120. The displayed image may only depict certain options that are available on the vehicle. Additional data displayed with the image in the data view area 132 may include an option form for allowing a user to select additional options for display with the displayed image. Selecting a desired option, the user may transmit the new request 350 to server 110. The program 200 then processes the request 355 and responds to the request 360, displaying the new object image with the selected options.

When a server 110 receives a request requiring a response to a client, the server 110 may establish the amount of work in its queue before responding to the request. The request is then processed 355 by distilling the requested selections and putting them into a data dictionary, or hash table, for processing a request. The data dictionary provides characteristics for the image data 290 that are to be sent to client 120 as a result of the request. The program 200 uses the data dictionary to define the new parameters of the request and form the new image data 290 that may then be passed to the client 120. The data for creating the response to the new request may be retrieved from the server 110 or from a distributed server 110A associated with server 110.

The characteristics for the image data 290 may correspond to different effects that are stored, or accessible to, server 110. To alter the image data 290 in response to a request, the program 200 iterates over the pixels using a mask channel to composite the original image data 290 with the requested effects. This is repeated until all of the optional images are composited with the original image data 290. Alternatively, each corresponding pixel for each image in the matrix of image data 290 may be compared and altered at the same time to decrease the amount of processing time. The effects, options, and original image data 290 may therefore be combined into new image data 290 to be sent to client 120 in response to the request.

Upon receiving a response from server 110, client 120 decodes the response and unobfuscates the response if necessary. The image displayed in the object view area 130 may then be updated according to the image data 290 received in response to the option request.

A background image may also be used or created by program 200. The background image may be incorporated with the image created by image data 290 such that it appears that the image exists within the background image. For example, the vehicle image may be placed on a background image of a beach or in the woods such that the vehicle image appears as it may in a particular setting corresponding to the background image.

In addition to the display of an image defined by image data 290, the various embodiments of the present invention may also display information about the image in a data view area 132. Information may be associated with the various views of an object image defined by image data 290. Each view of image data 290, or portions of each view of image data 290, may be associated with displayable information such that when a particular view of an image defined by image data 290 is displayed, information corresponding to that view may also be displayed. In addition, further customization may be provided such that information is displayed based upon the location of a graphical user interface tool within a displayed image. For instance, a user may rotate and view an image by manipulating a graphical user interface over a displayed image. If the user stops moving the graphical user interface the location of the graphical user interface may be calculated and compared to the parameters stored in the object view parameter holder for the displayed image. Information corresponding to a particular parameter area may be displayed in the data view area 132 based upon the positioning of the graphical user interface tool. The configuration engine 232 may determine the position of the graphical user interface tool, compare the position to the parameters stored in the parameter view object holder 233 and display information from a data source corresponding to that particular parameter.

For example, image data 290 may provide a three-dimensional rendering of a vehicle having a number of available options. A corresponding information data file comprising different data sets may include information about different portions of the vehicle. Each data set in the information on file may also correspond to a parameter as defined and stored in the object view parameter holder 233. For instance, a data set describing the tires of the vehicle may correspond to all of the parameters defining the tire locations of the displayed vehicle. If the graphical user interface tool is positioned over a tire of the vehicle, the data set corresponding to the description of the tires may be displayed in the data view area 132. Other data sets may be used to describe other portions of an image.

In yet another embodiment of the present invention, the interactive display program includes the ability to detect the capabilities of and adapt to optimized versions of the object representation data for the display device by querying attributes about the display device and the source of the object representation data. The object representation data may be prepared at various levels of detail. The interactive three-dimensional display program also possesses the ability to query the display device, detect optimized object representation data on the data source, and create optimized object representation data from unoptimized object representation data.

Having thus described certain preferred embodiments of the present invention, is to be understood that the invention defined by the appended claims is not to be limited by particular details set forth in the above description, as many apparent variations thereof are possible without departing from the spirit or scope thereof as hereinafter claimed.

What is claimed is:

1. A method for rendering pixel-based three-dimensional images on a display, comprising:
   organizing each of a plurality of object images of similar angle into a resultant image of same angle representing one of many object views;
   combining a pixel of said resultant image with a pixel of a mask image to form a pixel definition;
   storing each pixel definition for said resultant image as a file;
   transmitting said file to an interactive display device; and
   rendering a three-dimensional image on said interactive display device.

2. The method of claim 1, wherein transmitting said file to said interactive display device comprises transmitting said file in an obfuscated format, and wherein rendering said three-dimensional image on said interactive display device from said file comprises rendering said three-dimensional image in an unobfuscated format.

3. The method of claim 1, further comprising altering said rendered three-dimensional image on said interactive display device according to user interactions.

4. The method of claim 1, wherein said resultant image comprises a two-dimensional matrix of images.

5. The method of claim 4, wherein a second mask image is combined with said two-dimensional matrix of images to provide effects for each pixel of said two-dimensional matrix of images.

6. The method of claim 1, wherein storing each pixel definition for said resultant image as a file comprises storing each pixel definition as a single, uncompressed image data file.

7. The method of claim 1, wherein combining each pixel of said resultant image with a pixel of a mask image comprises analyzing red, green and blue values for each pixel of each pixel and combining pixel color data with mask image data.

8. The method of claim 1, further comprising:
   providing an information data file having information relating to particular portions of said image on said interactive display device;
   displaying said information upon activation of an interface tool by a user.

9. A method for rendering pixel-based three-dimensional images on a display, comprising:
   combining a plurality of object images into a first dimension of images having similar radial pitch views and a second dimension of images having similar pitch angles;
   combining a pixel of said first dimension and second dimension of images with a pixel of a mask image to form a pixel definition;
   storing each pixel definition for said first dimension and second dimension of images as a file;
   transmitting said file to an interactive display device; and
   rendering a three-dimensional image on said interactive display device.

10. A method to simulate viewing a customizable three-dimensional object by rendering pixel-based images on a display, comprising:
    combining a plurality of object images into a single category by organizing images of one of an object's selectable features according to rotation and position;
    combining pixels of each selected category to form a pixel definition in a new category;
    storing each pixel definition of said new category into a file;
    transmitting said file to an interactive display device; and
    displaying images of said new category on said interactive display device to simulate viewing a three-dimensional object.

11. The method of claim 10, wherein transmitting said file to an interactive display device comprises transmitting said file in an obfuscated format, and wherein displaying images of said new category comprises displaying images of said new category in an unobfuscated format.

12. The method of claim 10, further comprising altering said three-dimensional object according to user interactions.

13. The method of claim 10, further comprising:
    providing an information data file having information relating to particular portions of said three-dimensional object on said interactive display device;
    displaying said information upon activation of an interface tool by a user.

14. The method of claim 10, wherein storing each pixel definition into a file comprises storing each pixel definition as a single, uncompressed image data file.

* * * * *